United States Patent [19]

Enomoto et al.

[11] Patent Number: 5,550,801
[45] Date of Patent: Aug. 27, 1996

[54] LINEAR ARRAYED DISC CHANGER WITH SHIFTABLE GUIDE PROJECTIONS

[75] Inventors: Kazuhisa Enomoto; Takao Yamazaki; Taiki Azuma; Shinji Tarutani, all of Saitama-ken, Japan

[73] Assignee: Pioneer Electronic Corporation, Tokyo, Japan

[21] Appl. No.: 368,913

[22] Filed: Jan. 5, 1995

[30] Foreign Application Priority Data

Jan. 5, 1994  [JP]  Japan .................................. 6-000125

[51] Int. Cl.⁶ ........................... G11B 17/22; G11B 17/04
[52] U.S. Cl. .............................. 369/178; 369/36; 369/191
[58] Field of Search ............................ 360/98.04, 98.06; 369/33, 34, 36, 37, 38, 178, 179, 191, 192; 312/9.11, 9.29, 9.32, 9.45, 9.48, 9.52

[56] References Cited

U.S. PATENT DOCUMENTS

| | | | |
|---|---|---|---|
| 3,009,705 | 11/1961 | Foelkel et al. | 369/34 |
| 4,610,008 | 9/1986 | Ishibashi et al. | 369/34 |
| 4,633,452 | 12/1986 | Shimbo et al. | 369/36 |
| 4,695,990 | 9/1987 | Kawakami | 369/36 |
| 5,036,503 | 7/1991 | Tomita | 369/34 |
| 5,282,183 | 1/1994 | Arifuku et al. | 369/36 |

FOREIGN PATENT DOCUMENTS

| | | | |
|---|---|---|---|
| 60-40563 | 3/1985 | Japan | 369/191 |
| 61-190753 | 8/1986 | Japan | 360/98.04 |
| 4-111277 | 4/1992 | Japan | 369/36 |

*Primary Examiner*—Stuart S. Levy
*Assistant Examiner*—David L. Ometz
*Attorney, Agent, or Firm*—Sughrue, Mion, Zinn, Macpeak & Seas

[57] ABSTRACT

An automatic disc changer has a casing for the automatic disc changer, and a plurality of disc holders arranged in the casing. The disc holder stores a plurality of disks in vertical positions. A reproducing device is provided in the casing to be moved along the disc holder. A movable frame is provided on the disc holder to be shifted by a pitch of the space in a direction of the arrangement of the disc holders. A plurality of guide projections are provided on the movable frame, which are disposed adjacent to ends of the holding plates. The guide projections are arranged by a pitch which is twice as much as the pitch of the space. Each guide projection has a triangular section, the bottom of which is approximately equal to a width of the space, so as to close a corresponding space.

4 Claims, 21 Drawing Sheets

LINEAR ARRAYED DISC CHANGER WITH SHIFTABLE GUIDE PROJECTIONS

BACKGROUND OF THE INVENTION

The present invention relates to a disc reproducing device for reproducing information recorded on a disc such as a CD, and more particularly to an automatic disc changer system in the reproducing system.

Japanese Patent Application Laid-open 60-138769 discloses an automatic disc changer system, whereby it is possible to store a large number of discs in a small space in the system, to change a disc at a high speed, and to meet requests for a simple structure with an accurate operation.

FIG. 24 shows the system. The system comprises a casing 1 having a pair of tray holders 2 secured thereto. A disc tray (not shown) on which a plurality of CDs are mounted in the vertical disposition is detachably mounted between the holders 2. A pair of pulleys 4 are rotatably mounted on opposite side plates 3 of the casing 1. A wire 5 is provided between the pulleys 4 for preventing the discs stored in the tray from falling out of the tray. An end 6 of the wire 5 is secured to a side of a disc reproducing device 10 through a spring 7. The other end 8 of the wire is secured to an opposite side of the reproducing device 10. The reproducing device 10 is movable in the directions A and B along the discs between the side plates 3. The device 10 has a disc loading device 20 provided on a front portion thereof so as to pick up a selected disc from the tray and load the disc in the device 10 through an opening (unnumbered).

In an automatic changing operation of the disc, when one of the discs is selected to be reproduced, the reproducing device 10 is horizontally moved in the direction A or B and stopped at the position of the selected disc. In this state, the wire 5 is circulated together with the reproducing device 10 so that the wire does not obstruct the movement of the device. By the spring 7 on the wire, a predetermined tension is exerted on the device 10.

At the position, the selected disc is loaded by the loading device 20 in the reproducing device 10 through the inlet 11.

In the system, the wire 5 is secured to the device 10 and extended over the disc tray so that the disc which is accidentally removed from the tray caused by vibration is prevented from falling out.

FIG. 25 shows a disc tray 30 having a plurality of curved holding plates 31 so as to form spaces 32 therebetween for storing the discs. As shown in FIG. 26, the holding plate 31 has a tapered upper end. A disc 35 is stored in the space 32. When a selected disc 35 is to be loaded in the reproducing device 10 of FIG. 24, a loading arm 33 rotatably mounted in the loading device 20 is inserted into the space 32 between the holding plates 31. A loading end 34 of the loading arm 33 is engaged with the disc 35 so that the disc is removed from the tray by returning the loading arm 33.

In such a structure, it is necessary to accurately position the end 34 of the loading arm 33 corresponding to the disc 35 in the space 32 and the tapered end of the holding plate 31.

If the end 34 is deflected, the end may be inserted into an adjacent space 32 of the selected disc, causing troubles in the operation.

SUMMARY OF THE INVENTION

An object of the present invention is to provide an automatic disc changer system in which the dimensions of the parts is easily managed and a selected disc is accurately loaded.

According to the present invention, there is provided an automatic disc changer for a disc reproducing system having a casing for the automatic disc changer, and a plurality of disc holders arranged in the casing, each of the disc holders comprising a plurality of holding plates forming spaces therebetween for storing a plurality of discs in vertical positions, a reproducing device provided in the casing to be moved along the disc holders, the reproducing device having a loading arm to be inserted into one of the spaces for loading a selected disc on the reproducing device, a movable frame provided on the disc holder to be shifted by a pitch of the space in a direction of the arrangement of the disc holders, a plurality of guide projections provided on the movable framer disposed adjacent to ends of the holding plates.

The guide projections are arranged by a pitch which is twice as much as the pitch of the space, each of the guide projections having a triangular section, the bottom of which has an approximately equal to a width of the space so as to close a corresponding space.

Shifting means is provided for shifting the movable frame by one pitch of the space.

The end of each of the holding plates has a triangular tip end, and both edges of the bottom of the guide projection are disposed adjacent to tip ends of triangular tip ends of a pair of holding plates.

The other objects and features of this invention will become apparent from the following description with reference to the accompanying drawings.

DETAILED DESCRIPTION OF THE PREFERRED EMBODIMENT

Figure 1:
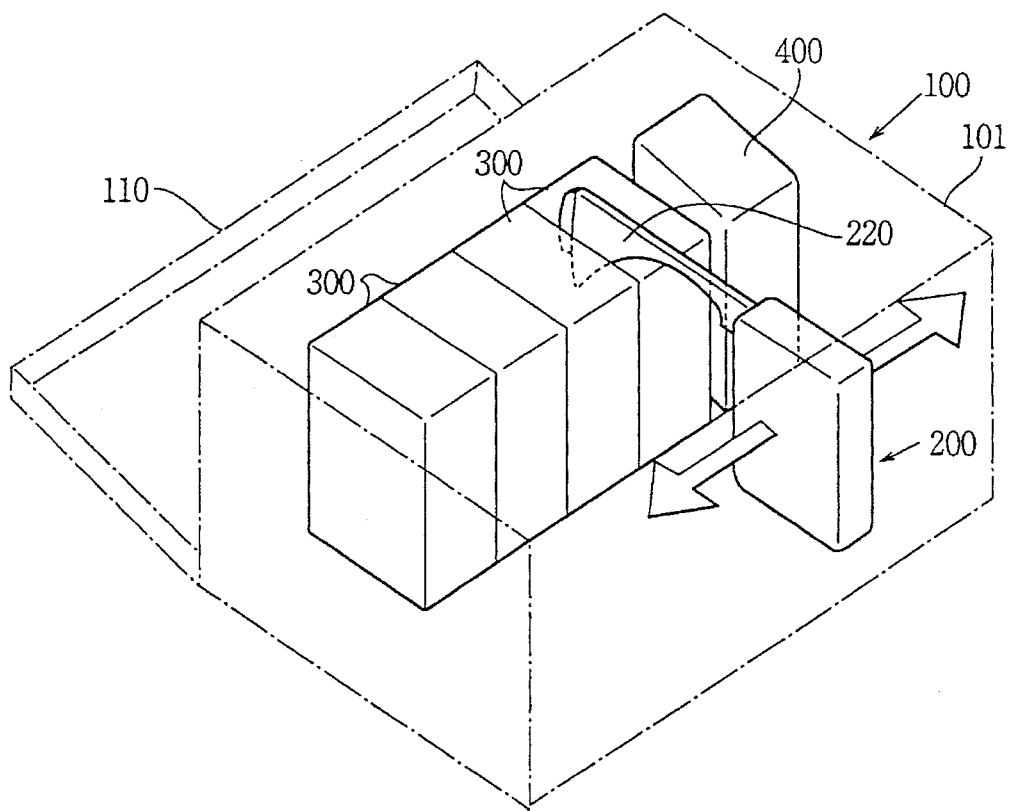
FIG. 1 is a perspective view schematically showing an automatic disc changer system to which the present invention is applied.

Referring to FIG. 1, a disc reproducing system having an automatic disc changer system according to the present invention comprises a casing 100, and a door 110 provided in front of the casing 100. In the casing 100, a disc reproducing device 200 having a disc loading mechanism, a plurality of disc holders 300, and an auxiliary disc holder 400 are provided. The reproducing device 200 is movably mounted in the casing along the holders 300 disposed in the horizontal direction. The auxiliary disc holder 400 has a plus-one mechanism and is provided adjacent to the end holder 300.

Figure 2:
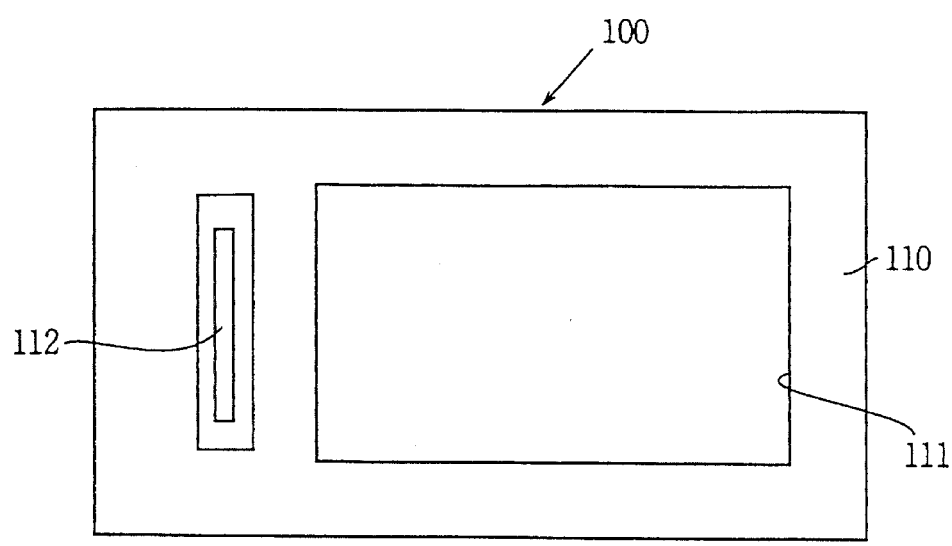
FIG. 2 is a front view of the system.

Referring to FIG. 2, the door 110 has a transparent window 111 made of plastic, and a vertical inlet 112 formed corresponding to the auxiliary disc holder 400.

Figure 3:
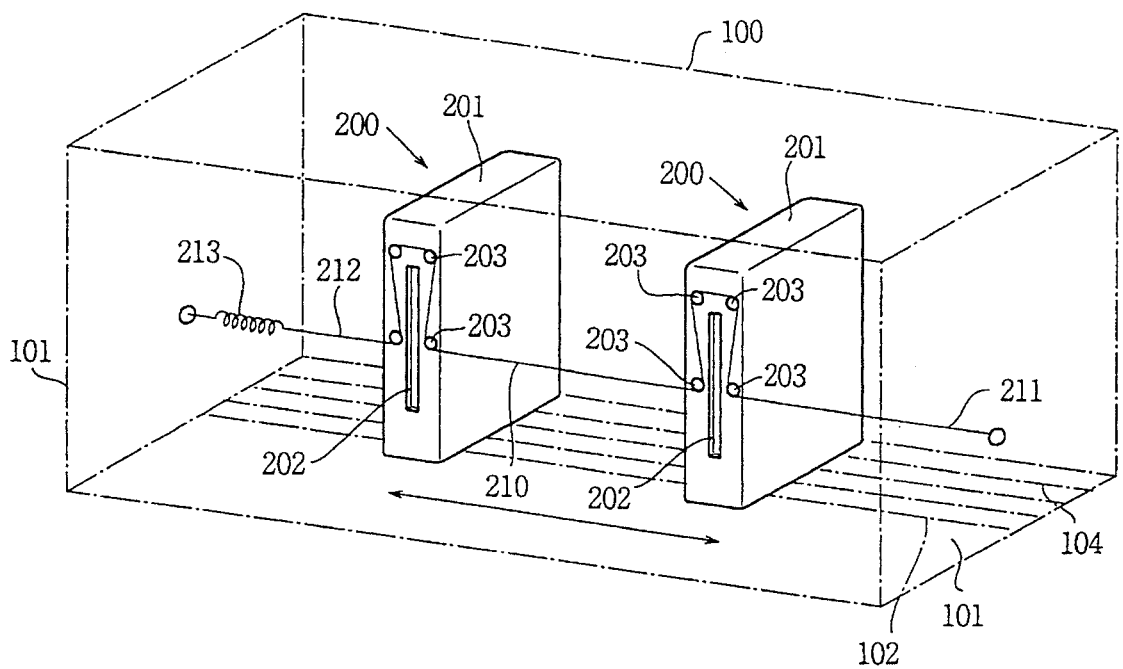
FIG. 3 is a perspective view showing disc reproducing devices of the system.

Referring to FIG. 3, the disc reproducing system of the present invention has two disc reproducing devices 200 slidably mounted on rails 102 and 104. Each of the disc reproducing devices 200 has a casing 201, a vertical opening 202 formed in a front portion of the casing 201, and four rollers 203 rotatably mounted around the inlet 202. A driving device (not shown) is provided in the reproducing device 200 for driving the reproducing device 200 along the rails 102 and 104. A wire 210 is provided between opposite side plates 101 of the casing 100 for preventing a disc stored in the disc holder 300 from coming out of the holder. An end 211 of the wire 210 is connected to the side plate 101 of the casing and the other end 212 of the wire is connected to the other side plate 101 through a spring 213. The wire 210 is engaged with the four rollers 203 of each disc reproducing device 200 in the shape of an inverted U-shape so as to avoid the opening 202. Thus, the reproducing devices 200 can be independently moved along the wire 210 and the rails 102 and 104.

As shown in FIG. 1, the reproducing device 200 has a disc loading arm 220 rotatably mounted in the casing 201 and projected from the opening 202 to the disc holder 300.

Figure 4:
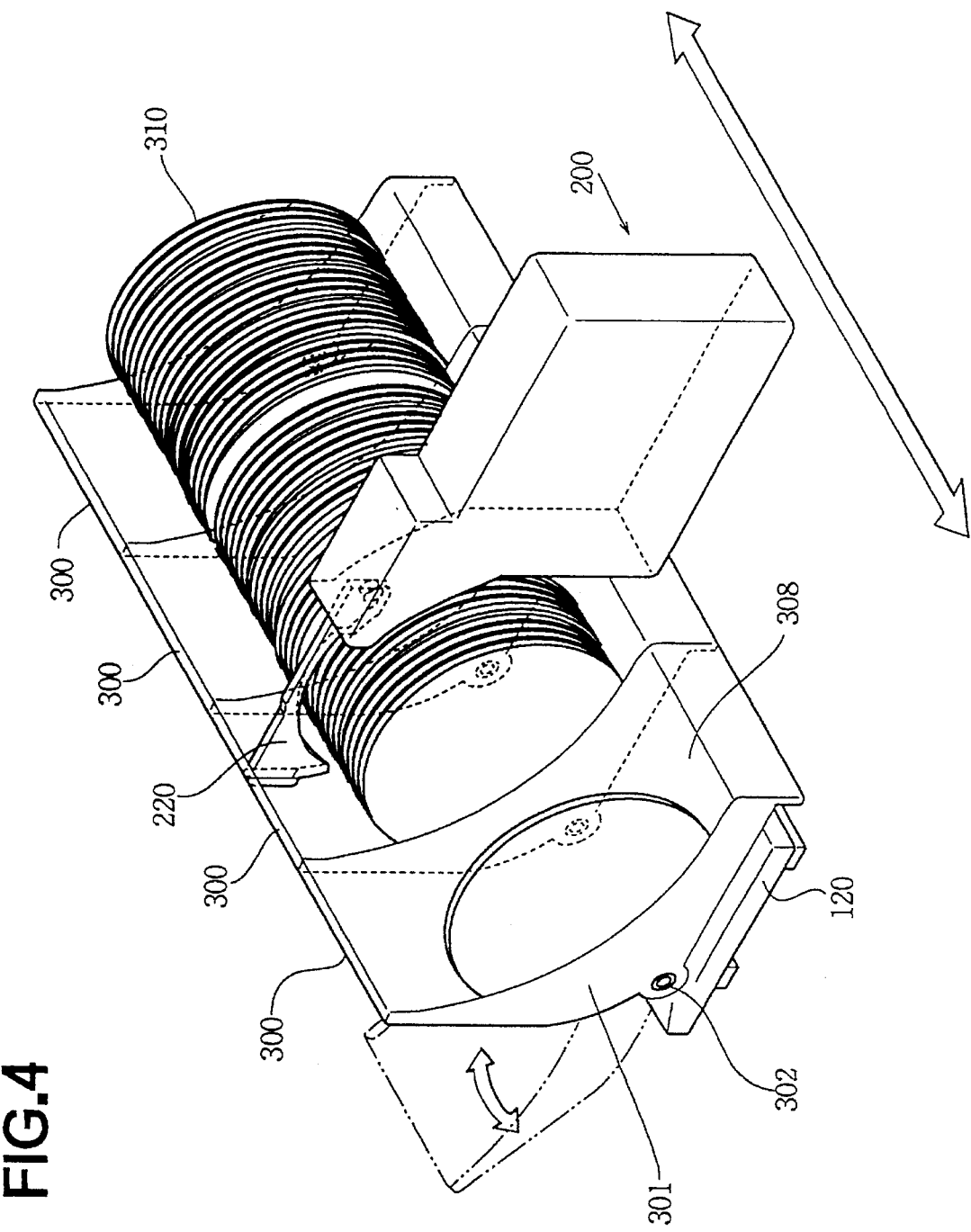
FIG. 4 is a perspective view showing a main part of the system.

Referring to FIG. 4 showing the disc holders 300 in the casing 100, four disc holders 300 are horizontally arranged corresponding to the front portions of the reproducing device 200. A plurality of optical discs 310 are stored in each holder 300 arranged in the horizontal direction. Each of the discs 310 is held in the holder in a vertical disposition so as to be removed from the holder.

Each of the disc holders 300 comprises a base plate 308 having approximately an L-shape in section to be pivotally mounted on a supporting plate 120 provided in the casing 100, and a pair of side plates 301 having a curved periphery.

Figure 5:
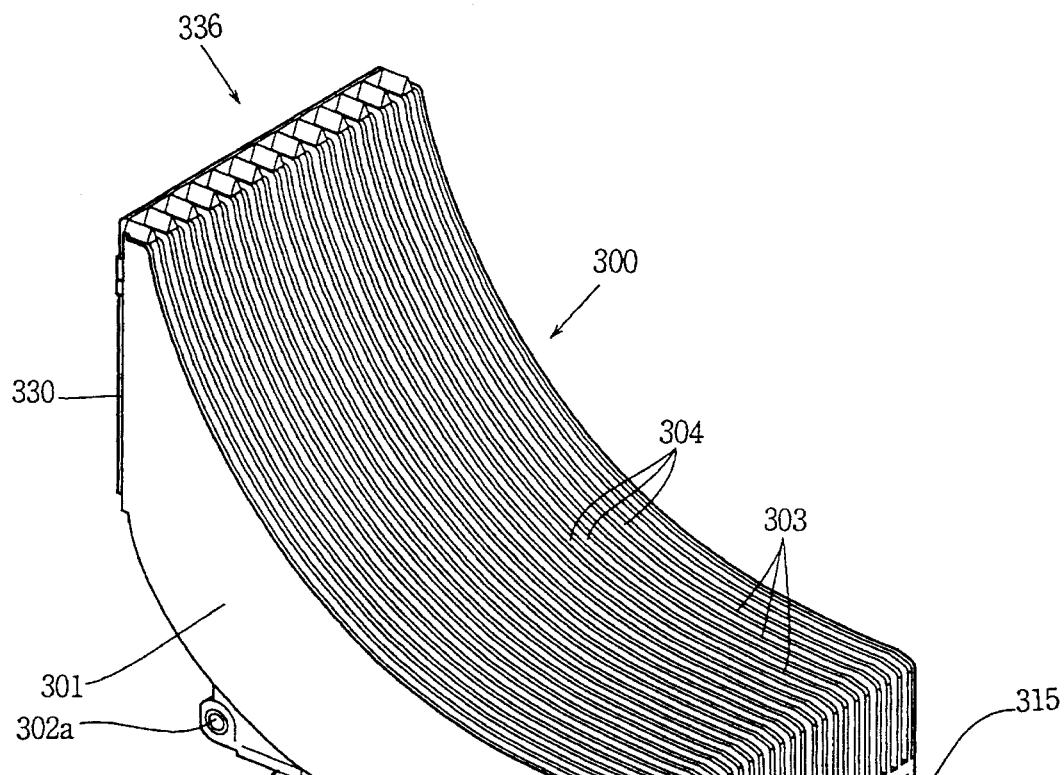
FIGS. 5a and 5b are perspective views showing a disc holder.
Figure 5:
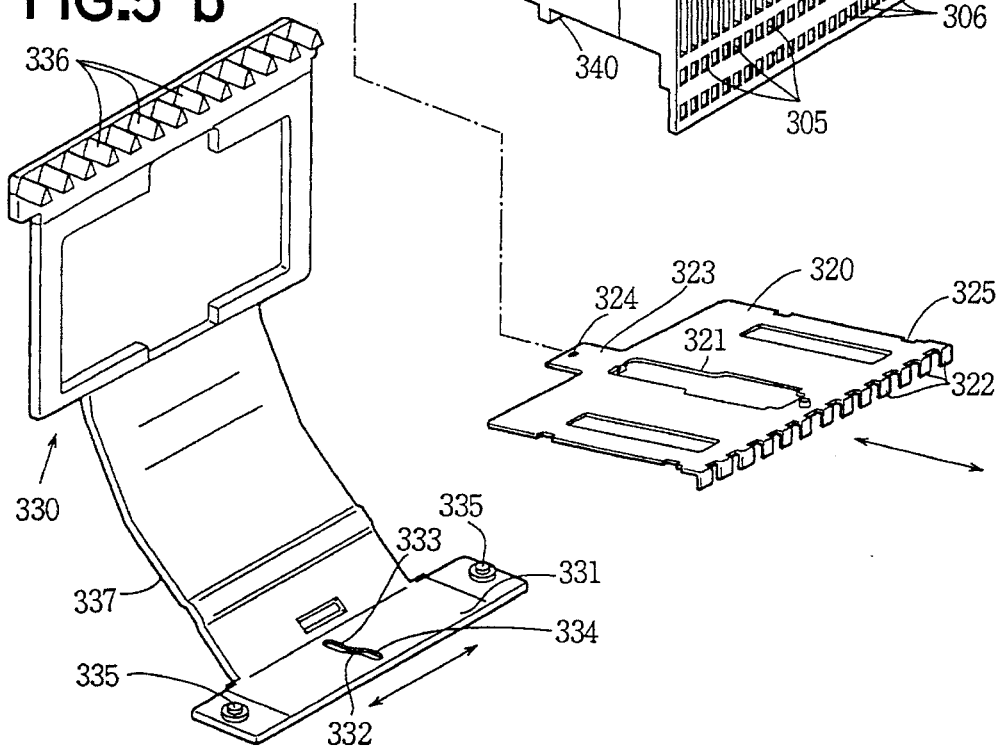
Figure 6:
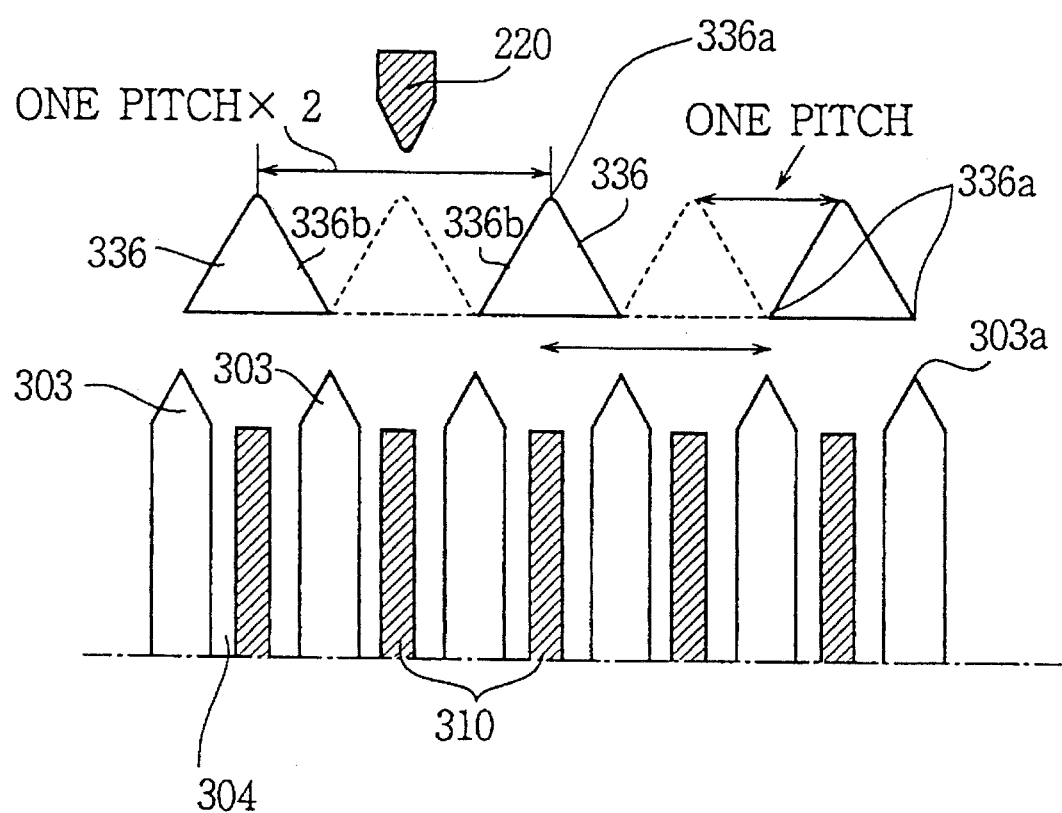
FIG. 6 is a schematic diagram showing the disc holder.

Referring to FIGS. 5a and 5b, a plurality of holding plates 303 are vertically secured to the base plate 308 between the side plates 301 at a predetermined distance so as to form a space 304 between a pair of holding plates 303 for holding the disc 310. Each of the holding plates 303 has the same configuration as the side plate 301 in plane, and an upper end portion has a triangular tip end 303a (FIG. 6).

The disc holder 300 further has a front panel 315 secured to a front end of the base plate 308 to be downwardly projected. A plurality of guide perforations 305 are formed, arranged in the horizontal direction corresponding to the spaces 304. On a lower portion of the perforations 305, an encoder 307 having a plurality of detecting perforations 306 is provided corresponding to the perforations 305.

On the base plate 308, a slide plate 320 and a movable frame 330 are attached.

The slide plate 320 has an elongated opening 321, projecting portion 323 having a pin 324, and a plurality of blocking lugs 322 formed corresponding to the perforations 305 of the front panel 315 at every other perforation. A pair of side notches 325 are formed on opposite sides of the slide plate.

The movable frame 330 comprises a guide plate 331 formed on a lower portion, a plurality of horizontally arranged guide projections 336 formed on an upper end portion, and a middle plate 337 provided between the guide plate 331 and the projections 336. The guide plate 331 has a cam slit 332 having cam portions 333 and 334 to be engaged with the pin 324 of the slide plate 320, and a pair of guide pins 335 provided on opposite sides. The cam portions 333 and 334 are deflected by the pitch of the space 304. Each guide projection 336 is in the form of a triangular prism.

As shown in FIG. 6, a bottom side of the triangular prism of the guide projection 336 has a length of one pitch of the space 304 between the holding plates 303 and both edges 336a corresponds to the tip ends 303a of the adjacent holding plates 303. Thus, the distance between the apexes 336a of the projections 336 is twice as much as the pitch of tip ends 303a.

Figure 7:
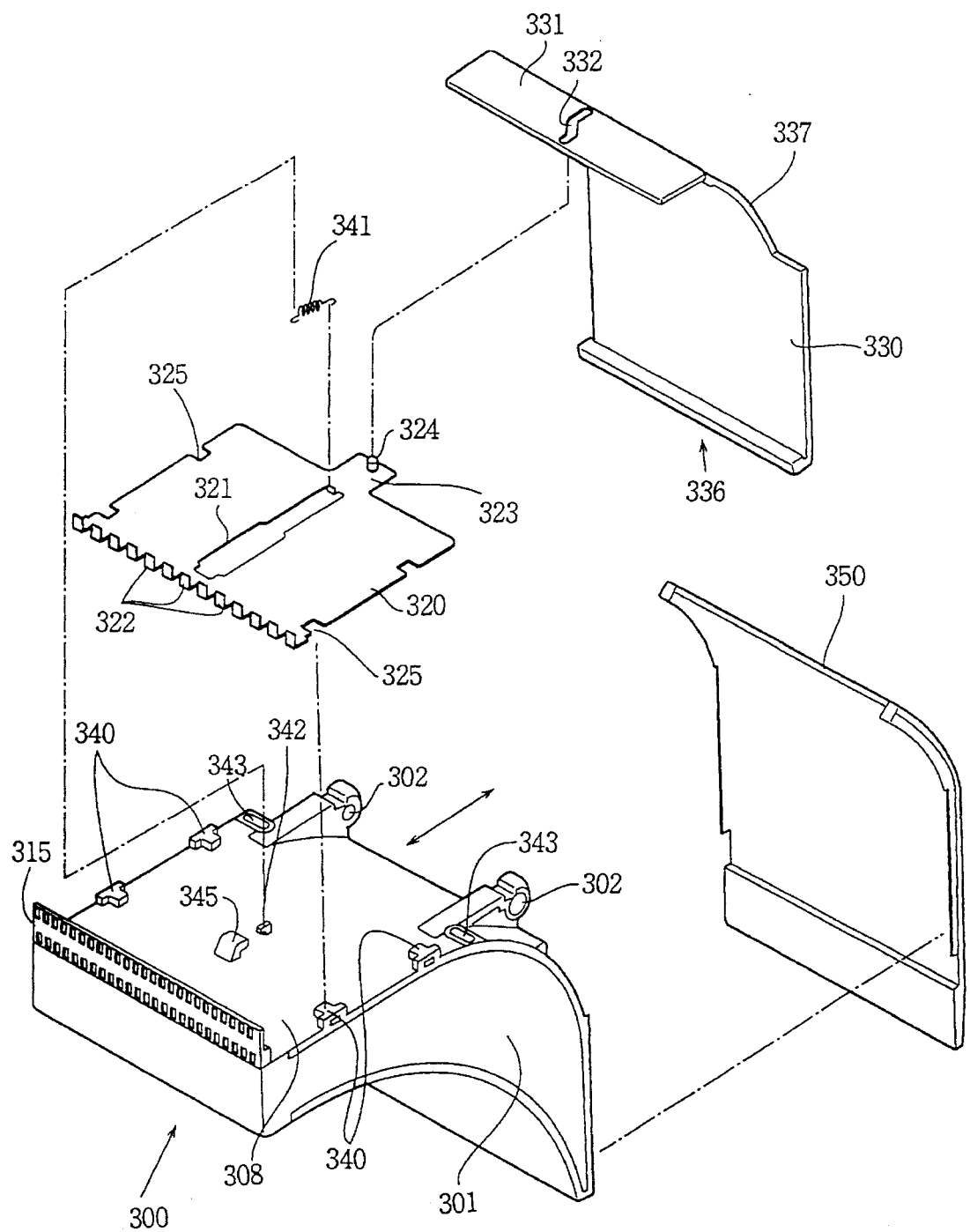
FIG. 7 is an exploded perspective view showing the disc holder viewed at the bottom.

Referring to FIG. 7, the base plate 308 has a pair of connecting lugs 302 rotatably engaged with the supporting plate 120 through connecting pins 302a (FIG. 5a), a pair of engaging projections 340 provided on opposite sides corresponding to the side notches 325 of the slide plate 320, and a pair of guide grooves 343 engaged with the guide pins 335 (FIG. 5b) of the guide plate 331 of the movable frame 330. A hook 342 is provided on the central portion for a spring 341. An engaging projection 345 is provided to be engaged with the opening 321 of the slide plate 320.

In order to assemble the slide plate 320 and the movable frame 330 on the base portion of the base plate 308, the side notches 325 of the slide plate 320 are engaged with the corresponding projections 340, while the engaging projection 345 is engaged with the opening 321. The spring 341 is provide between a hook formed on the periphery of the opening 321 of the slide plate 320 and the hook 342 of the base plate 308 to urge the slide plate 320 to the front panel 315. Thus, the lugs 322 of the slide plate 320 are abutted on the periphery of the perforations 305 on the front panel at every other perforation.

The guide plate 331 of the movable frame 330 is mounted on the projecting portion 323 of the slide plate 320 and the cam slit 322 is engaged with the pin 324, while the guide pins 335 (FIG. 5b) are slidably engaged with the guide grooves 343 of the base plate 308. The middle plate 337 is mounted between the connecting lugs 302, and the projections 336 are mounted on the upper ends of the holding plates 303.

A cover plate 350 is mounted on the movable frame 330 and secured to the base plate 308 at the upper portions thereof. Thus, the movable frame 330 is movably held on the base plate 308 with the cover plate 350.

Figure 8:
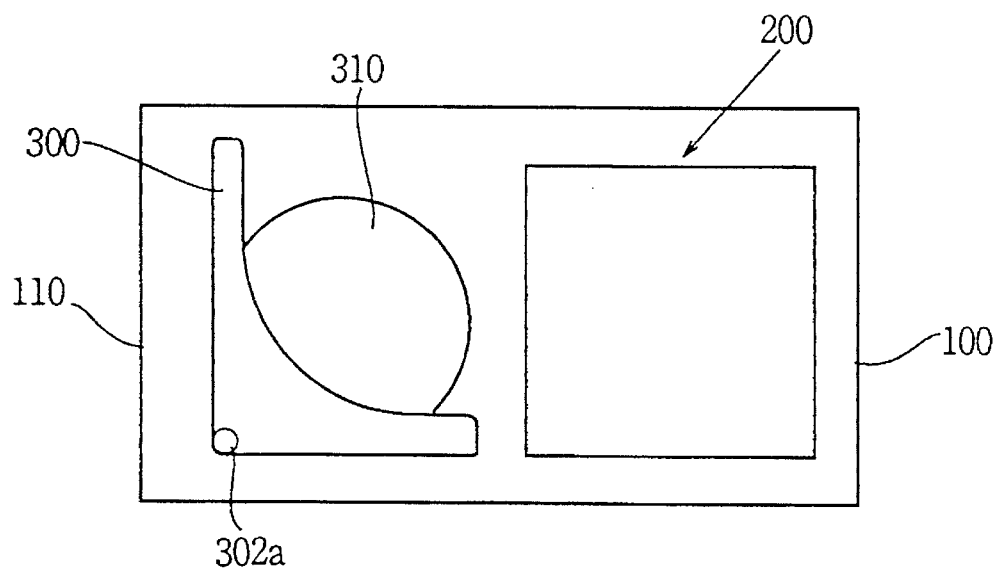
FIGS. 8a and 8b are schematic side views showing the system.
Figure 8:
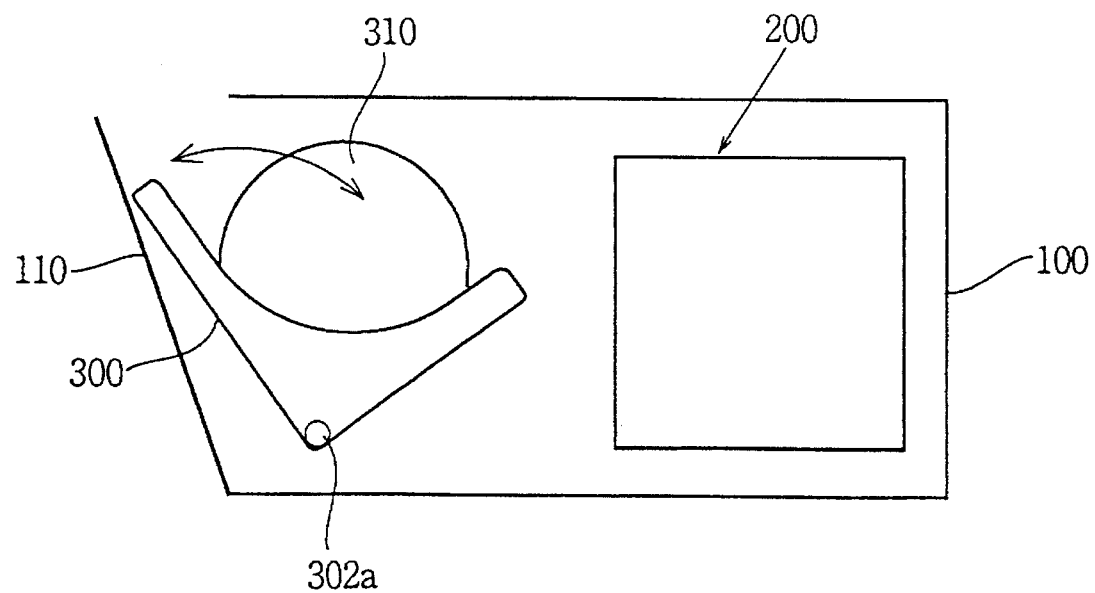

As shown in FIGS. 8a and 8b, when the door 110 of the casing 100 is opened, the disc holder 300 can be rotated about the connecting pins 302a to be exposed from the casing. Thus, the disc 310 in the holder 300 can be easily taken out from the casing and changed.

Figure 9:
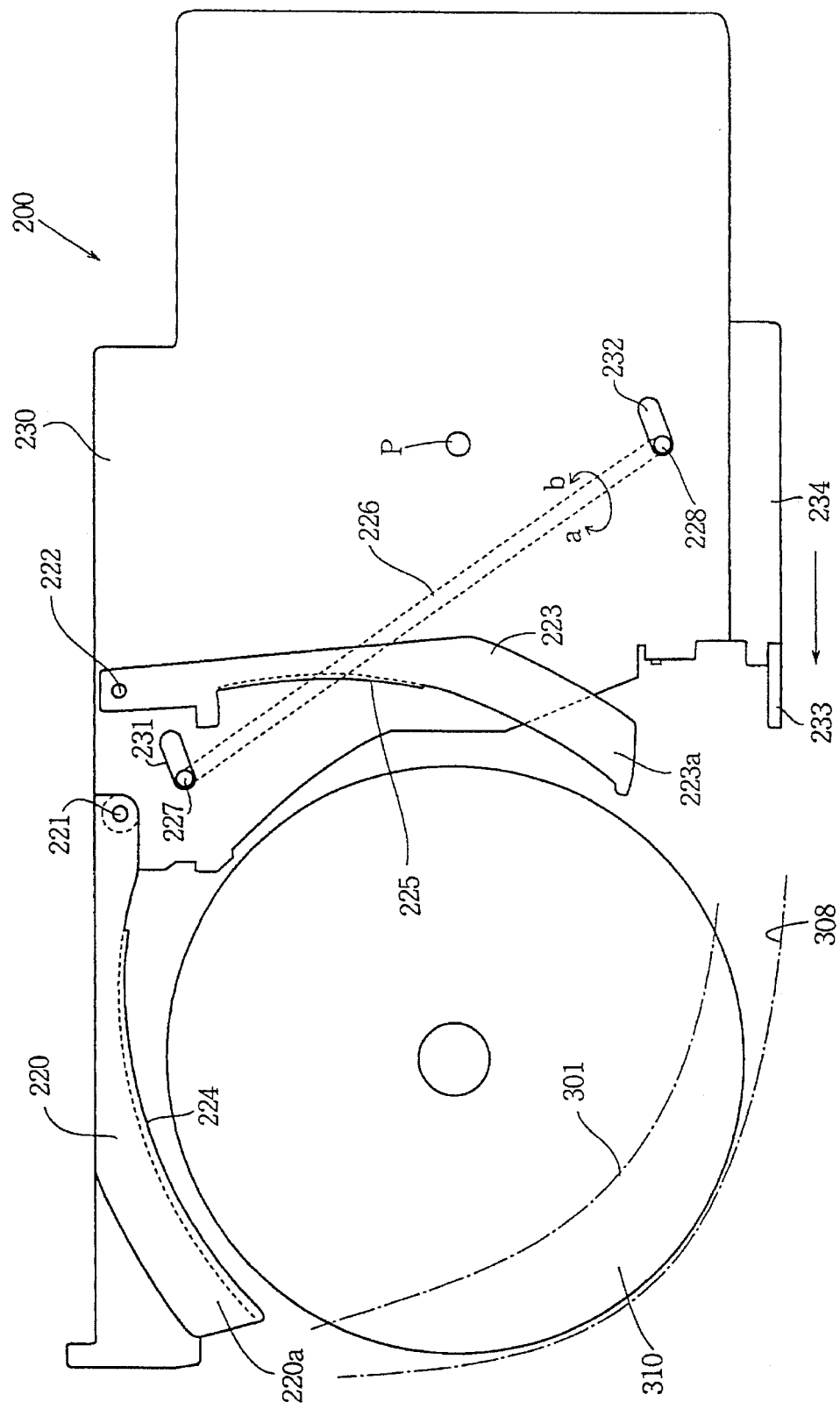
FIG. 9 is a sectional side view showing a main part of the disc reproducing device.

Referring to FIG. 9 showing the disc reproducing device 200, the disc loading arm 220 is rotatably mounted on a shaft 221 secured to an inner frame 230. A disc discharging arm 223 is rotatably mounted on a shaft 222 secured to the inner frame 230. The loading arm 220 has a loading end 220a and a guide groove 224 to be engaged with the periphery of the disc 310. The discharging arm 223 has a discharging end 223a and a guide groove 225 to be engaged with the periphery of the disc 310. The loading arm 220 and the discharging end 223a of the discharging arm 223 are adapted to pass through the inlet 202. Each of the guide grooves has a width slightly larger than the thickness of the disc 310.

On a lower portion of the inner frame 230, a slider 234 having a push rod 233 is slidably mounted. When a selected disc 310 is reproduced in the reproducing device 200, the slider 234 is moved in the direction shown by an arrow and the push rod 233 is engaged with a corresponding perforation 305 of the selected disc in the disc holder 300. After reproduction, when the disc is returned to the stored position, the slider 234 is moved in the reverse direction so that the push rod 233 is retracted from the perforation.

In order to load the disc 310 to a center P (clamping position), a position adjusting member 226 is rotatably mounted on an opposite surface of the inner frame 230 and urged in the direction a by a spring (not shown). The position adjusting member 226 has a pair of projections 227 and 228 provided on upper and lower ends thereof to be projected from elliptic holes 231 and 232 formed in the inner frame 230.

Figure 10:
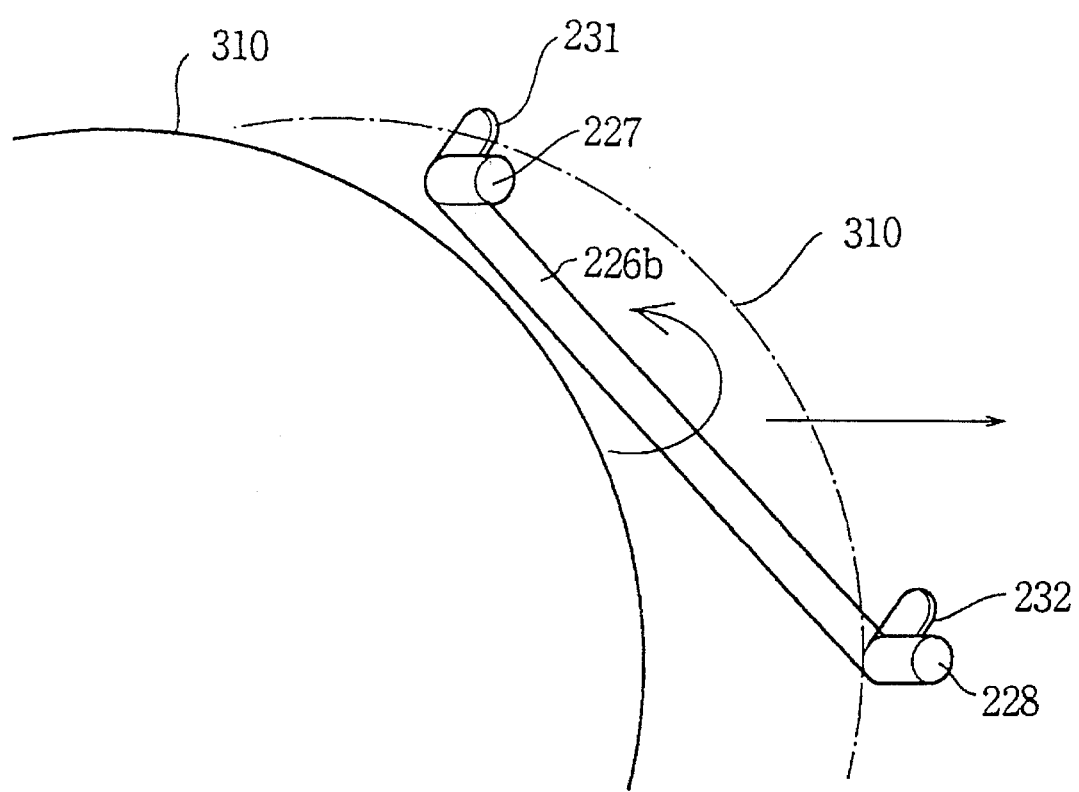
FIG. 10 is a schematic diagram showing a position adjusting member of a disc.

As shown in FIG. 10, when the disc 310 engages with the projections 227 and 228, the adjusting member 226 is rotated in the direction b against the spring force so that the projections 227 and 228 are rotated to be entirely engaged with the respective holes 231 and 232.

In the device, two sizes of the discs can be loaded by the loading mechanism, for example the disc 310 having the diameter of 12 cm and a disc 311 having the diameter of 8 cm.

The automatic changing operation of the disc will be described.

When a disc 310 to be reproduced is selected, one of the disc reproducing devices 200 is moved along the wire 210 to the selected disc in the holder 300. The rollers 203 provided on the reproducing device 200 are rotated on the wire 210 which is not circulated, so that only the selected device can be freely moved. Since the wire 210 is horizontally expanded along the disc holders 300, the discs 310 mounted in the holders are prevented from falling out.

The disc is selected in accordance with an address. A position sensor is mounted in the device 200 for detecting an on/off signal by the detecting perforation 306 of the encoder 307. Thus, the position of the selected disc is detected by the device 200.

At the selected position, the slider 234 in the device 200 is moved to the left of FIG. 9 so that the push rod 233 is inserted into the perforation 305 corresponding to the selected disc. In the disc holder 300, the blocking lugs 322 of the slide plate 320 close every other perforation 305. Namely, there are no lugs on the perforations 305 corresponding to the spaces 304 storing the discs of the even numbers. On the other hand, the lugs close the perforations 305 corresponding to the discs of the odd numbers. Thus, when the push rod 233 is abutted on the lug 322 through the perforation 305 at the odd number, the lug is pushed so that the slide plate 320 is slid against the spring 341. The pin 324 of the slide plate 320 engaged with the cam slit 332 is slid to be engaged with the cam portion 333 so that the movable frame 330 is moved to the right in FIG. 5b. Thus, the guide projections 336 are moved by the one pitch of the space 304 to open the spaces 304 where the discs of the odd numbers are stored.

The loading end 220a of the loading arm 220 is inserted into a space between the projections 336 and into the space 304 between holding plate 303. As hereinbefore described, the width of the entrance gap, that is, the distance between the apexes 336a of the guide projections 336 is twice as much as the pitch of the space 304. Therefore, the arm 220 easily enters the gap between the apexes and engages with the disc. Even if the arm 220 deflects from the center, the end 220a of the arm abuts on one of the slants 336b of the guide projection 336 so that the arm 220 is guided by the slant to the space 304. Thus, the arm can be exactly inserted into the space (FIG. 6).

It will be understood that the loading arm 220 is inserted into the space 304 for the disc of the even number without engaging with the lug 322 and hence without shifting the projections 336.

Figure 11:
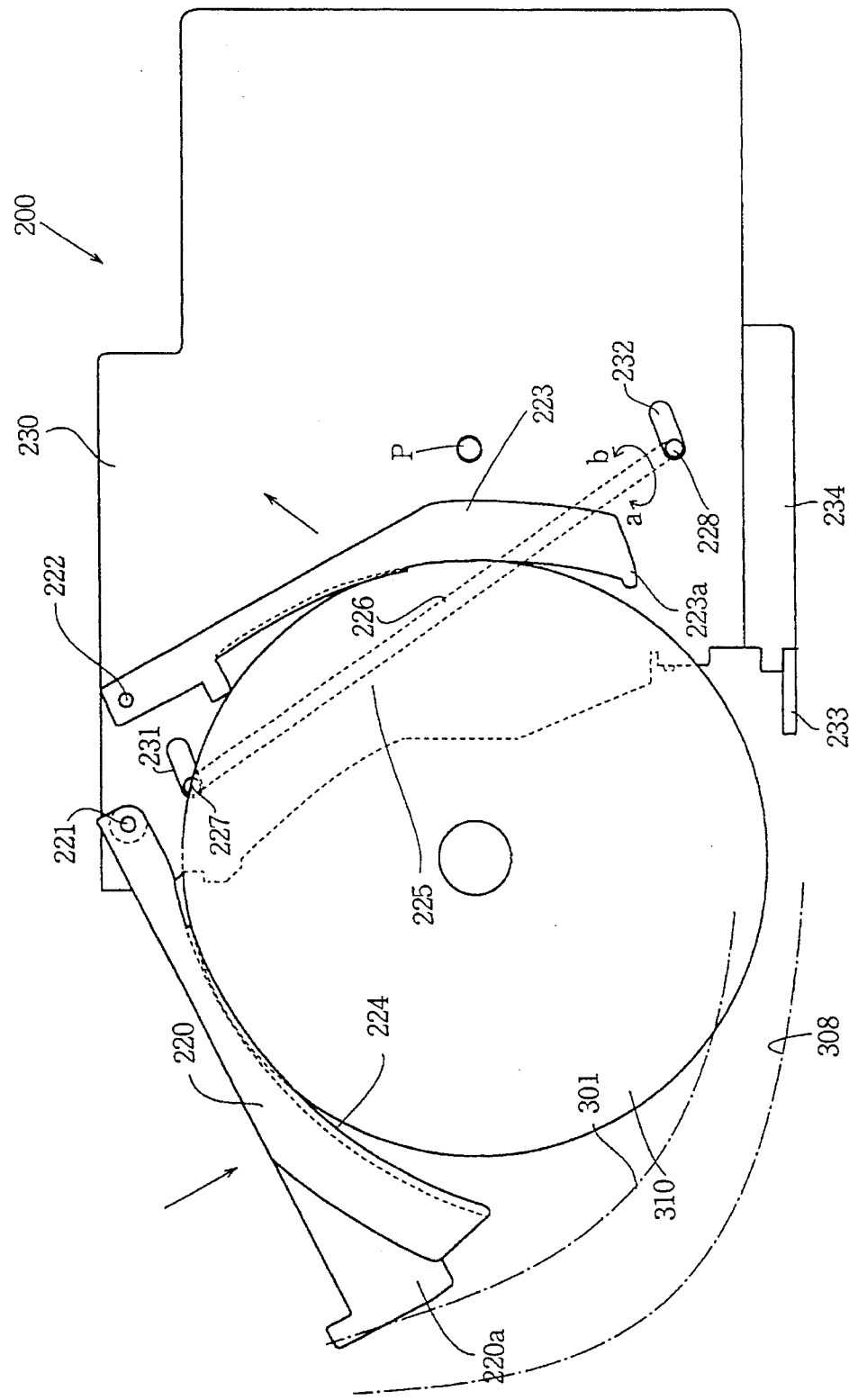
FIGS. 11 and 12 are sectional side views showing a loading operation of the disc.
Figure 12:
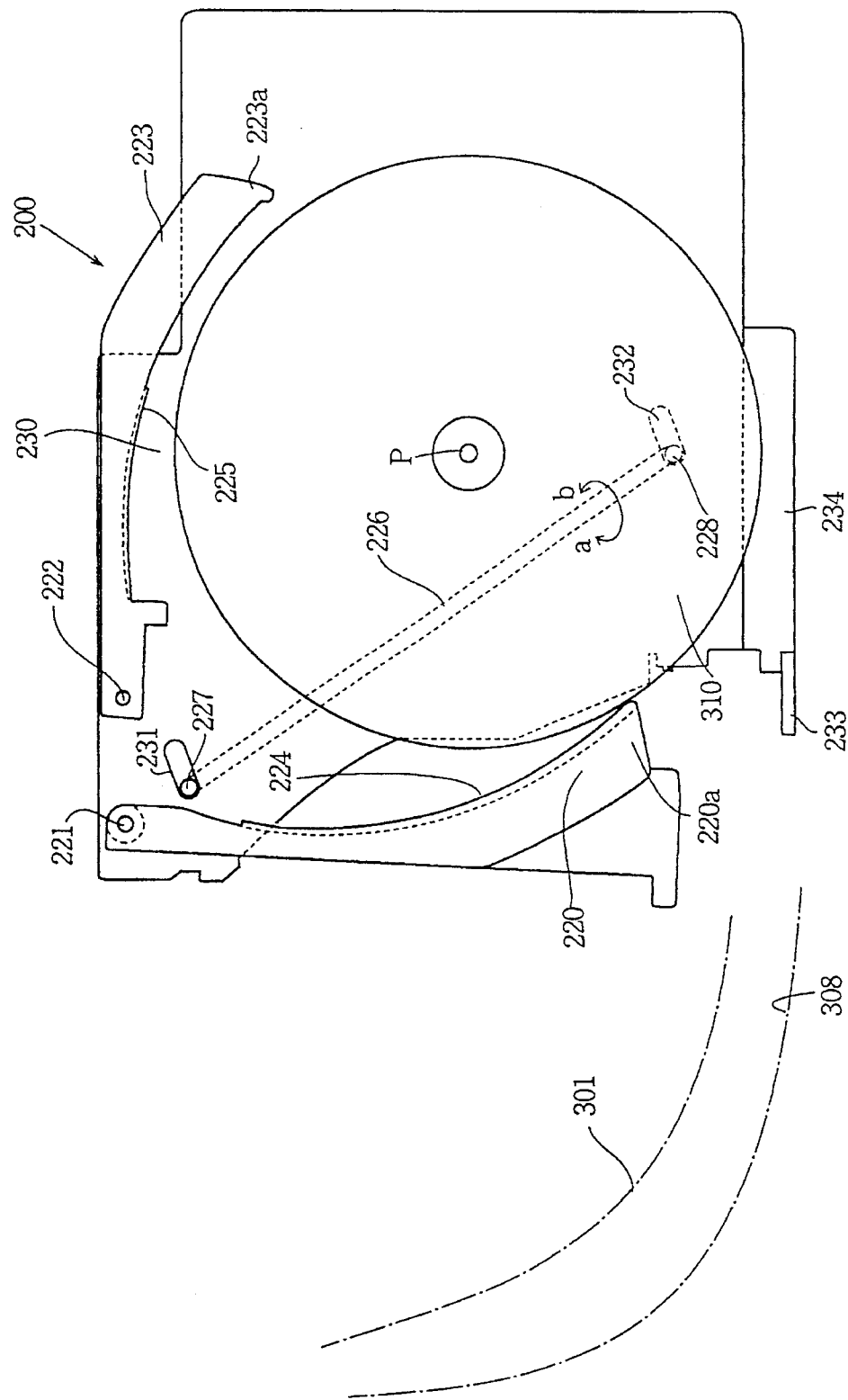

A loading operation of the disc 310 of 12 cm for the automatic changer system will be described, first, with reference to FIGS. 9, 11 and 12.

As shown in FIG. 9, at the selected position, the loading arm 220 is rotated in the counterclockwise direction. The loading end 220a is inserted into the space between the projections 336 and into the space 304. The guide groove 224 is engaged with the disc 310. The arm 220 is further rotated so that the disc is removed from the space 304 of the holder 300 and inserted into the inlet 210 of the device 200. The disc is engaged with the end 223a of the discharging arm 223 in the device 200 and the guide groove 225 as shown in FIG. 11.

Both of the arms 220 and 223 are further rotated in the counterclockwise direction. A periphery of the disc 310 is engaged with the projection 227 of the position adjusting member 226 so that the projection 227 is rotated in the direction b and engaged with the hole 231. The projection 228 engages with the hole 232, accordingly. As shown in FIG. 12, the disc is loaded to the clamping position P. The disc is clamped to a turntable (not shown) by a clamper (not shown). In this state, since the end 220a of the loading arm 220 is disengaged from the disc 310. The disc is reproduced without being disturbed by the arm.

After reproduction, the disc 310 is clamped to the position P and the discharging arm 223 is rotated in the clockwise direction to engage the end 223a with the disc. The disc is pushed to be disengaged from the projections 228 and 227. Thus, the adjusting member 226 is rotated in the direction a by the spring to be returned to the original position. The guide grooves 224 and 225 of the arms engage with the periphery of disc and guide the disc to be discharged from the inlet 202. Thus, the disc is stored in the holder. The slider 234 is moved to disengage the rod 233 from the perforation 305.

Consequently, the slide plate 320 is slid by the spring 341 to return to the home position and hence the movable frame 330 is moved to return to the original position.

Figure 13:
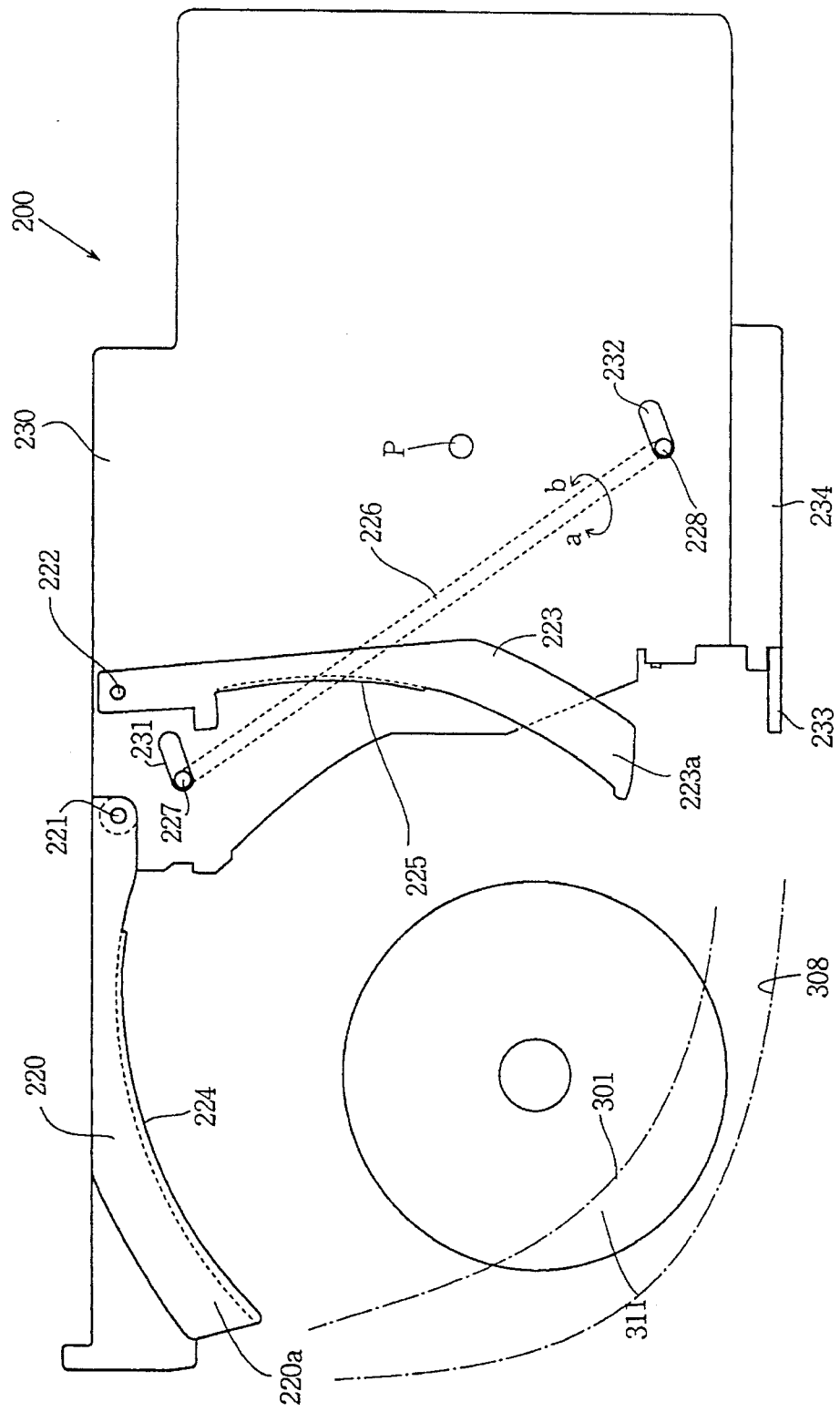
FIGS. 13, 14 and 15 are sectional side views showing a loading operation of another type of a disc.
Figure 14:
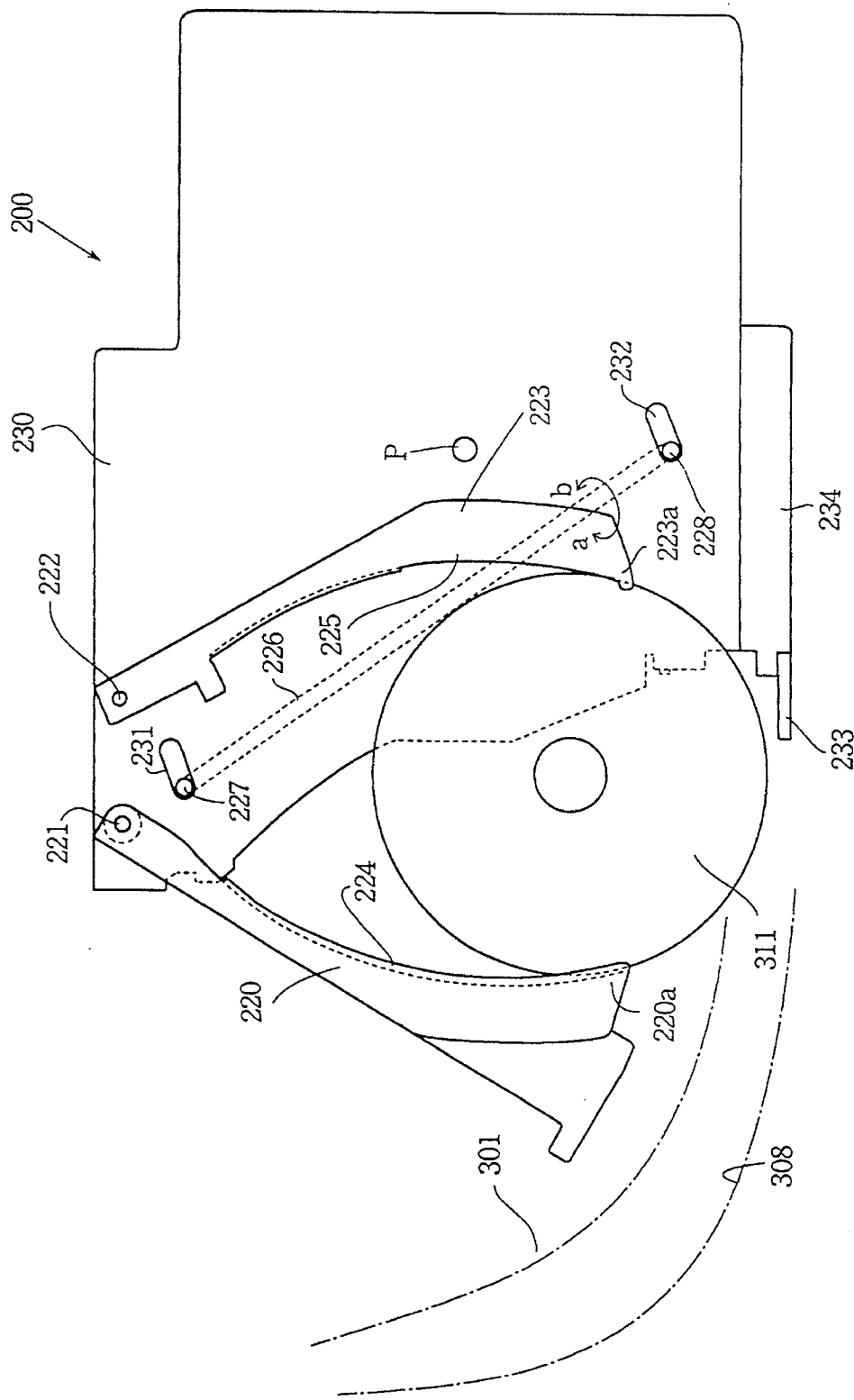
Figure 15:
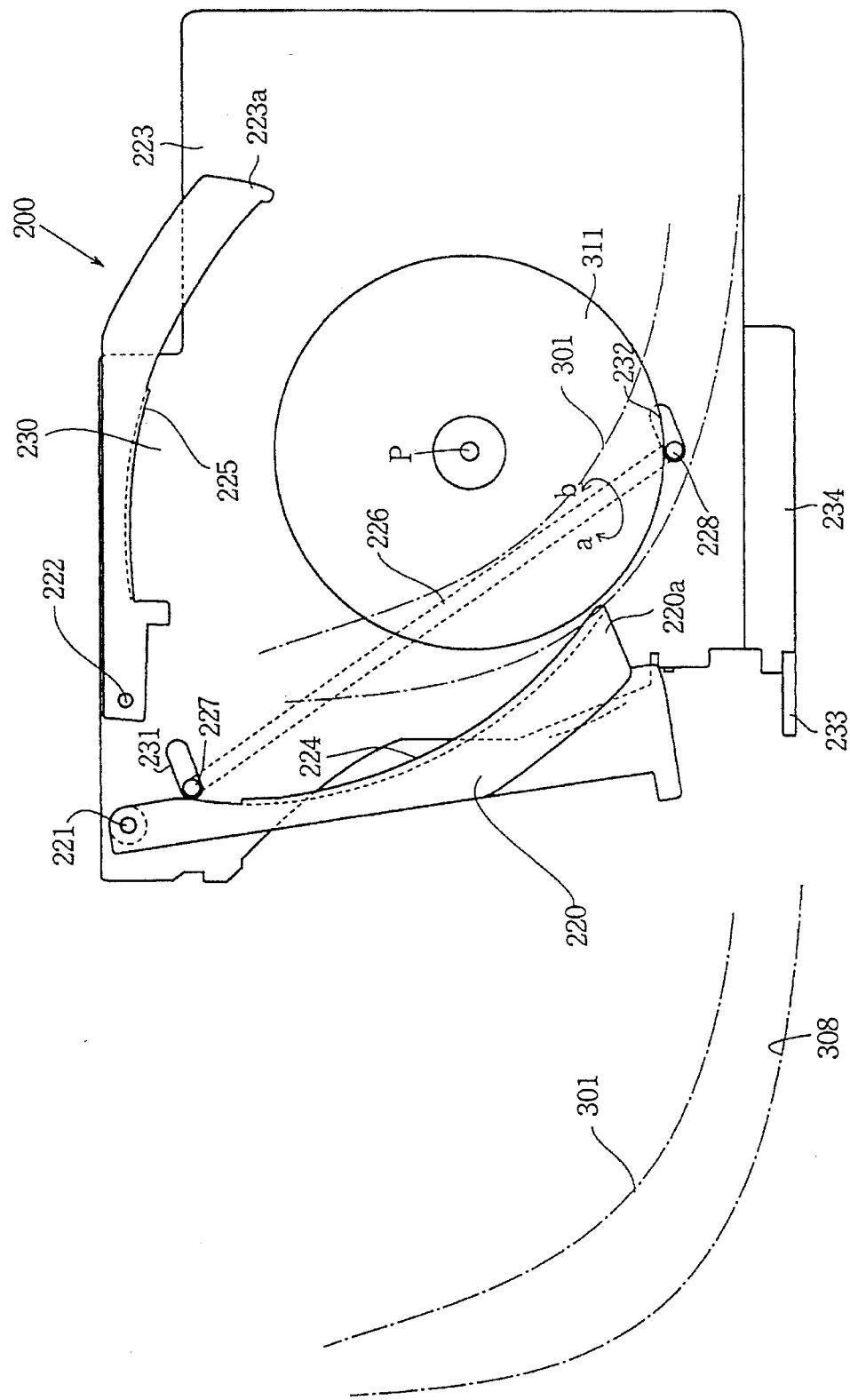

Describing a loading operation of the disc 311 of 8 cm with reference to FIGS. 13, 14 and 15, the operation is approximately the same as the disc 310. Namely, the arm 220 is rotated to engage the disc 311 in the space 304 at the end 220a so as to remove the disc 311 from the space. The disc 311 is loaded in the device 200 through the inlet 202 by the end 220a and engaged with the end 223a of the arm 223 as shown in FIG. 14. The disc 311 is guided to the clamping position P by the ends 220a and 223a. Since the disc 311 is smaller than the disc 310, the disc 311 is not engaged with the projection 227 of the adjusting member 226. At the position P, the disc 311 is engaged with the projection 228 which is not rotated and held in the position P by the end 220a of the arm 220 and the projection 228 as shown in FIG. 15.

When discharging the disc 311, the disc 311 is guided by the ends 233a and 220a to be discharged from the inlet 202.

Figure 16:
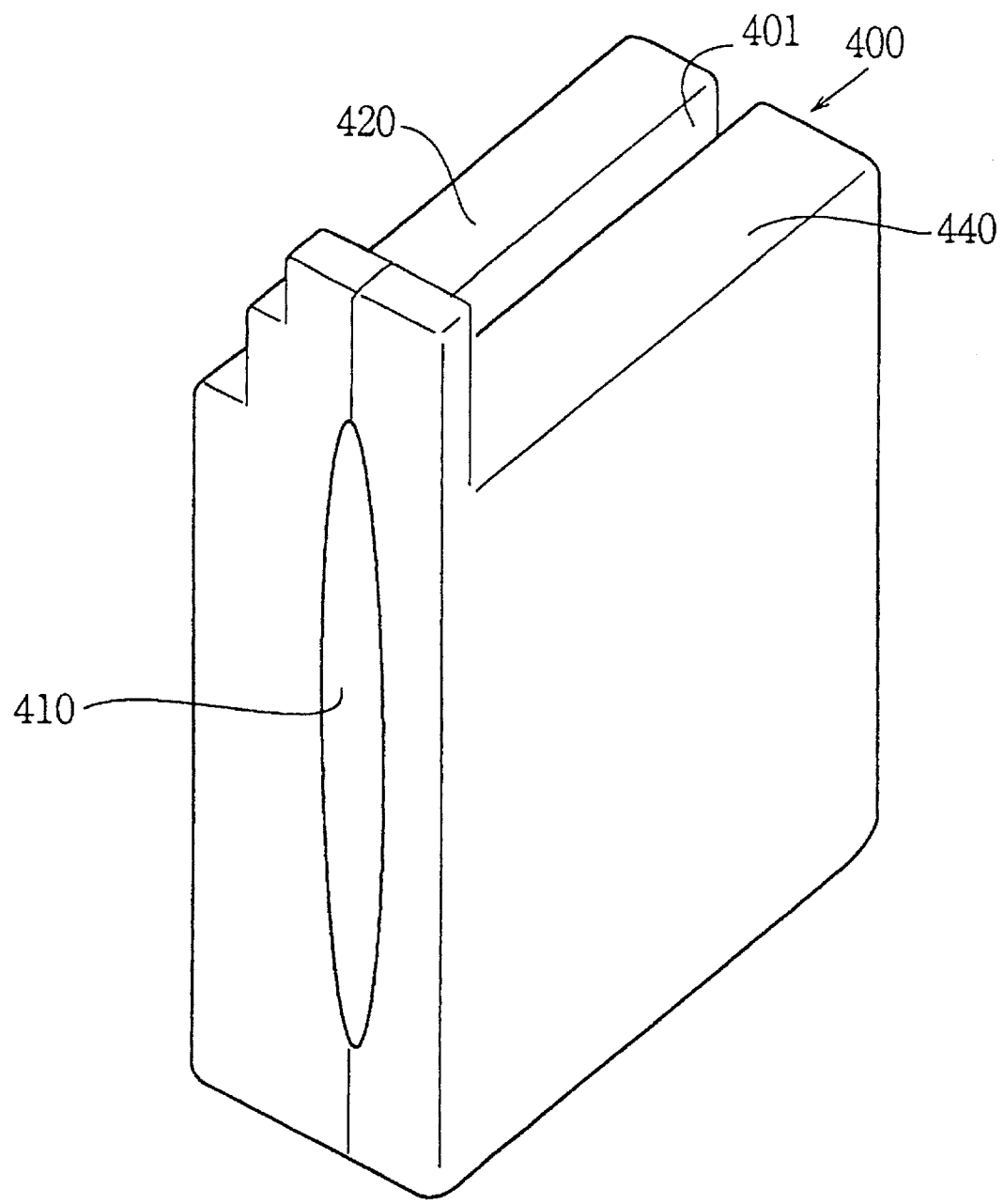
FIG. 16 is a perspective view showing an auxiliary disc holder of a plus-one mechanism.

Referring to FIG. 16 showing the auxiliary disc holder 400, the holder comprises a left frame member 420 and a right frame member 440. A vertical inlet 410 is formed between the left and right frame members corresponding to the inlet 112 of the door 110. On the side of the holder 400 corresponding to the disc reproducing device 200, a vertical space 401 is formed between the frame members. The loading arm 220 of the reproducing device 200 can be inserted into the space 401.

Figure 17:
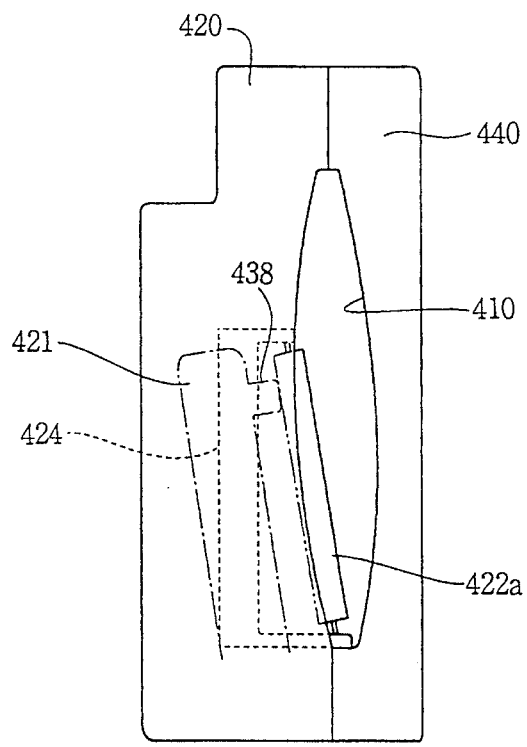
FIG. 17 is a front view of the holder.
Figure 18:
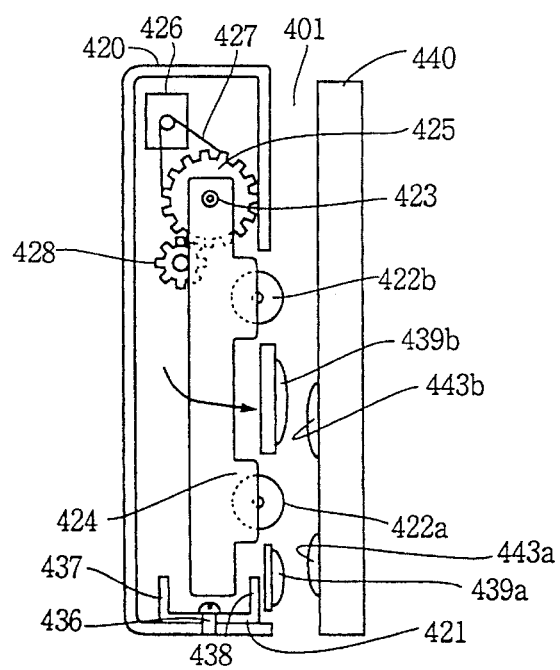
FIG. 18 is a sectional plan view of the holder.
Figure 19:
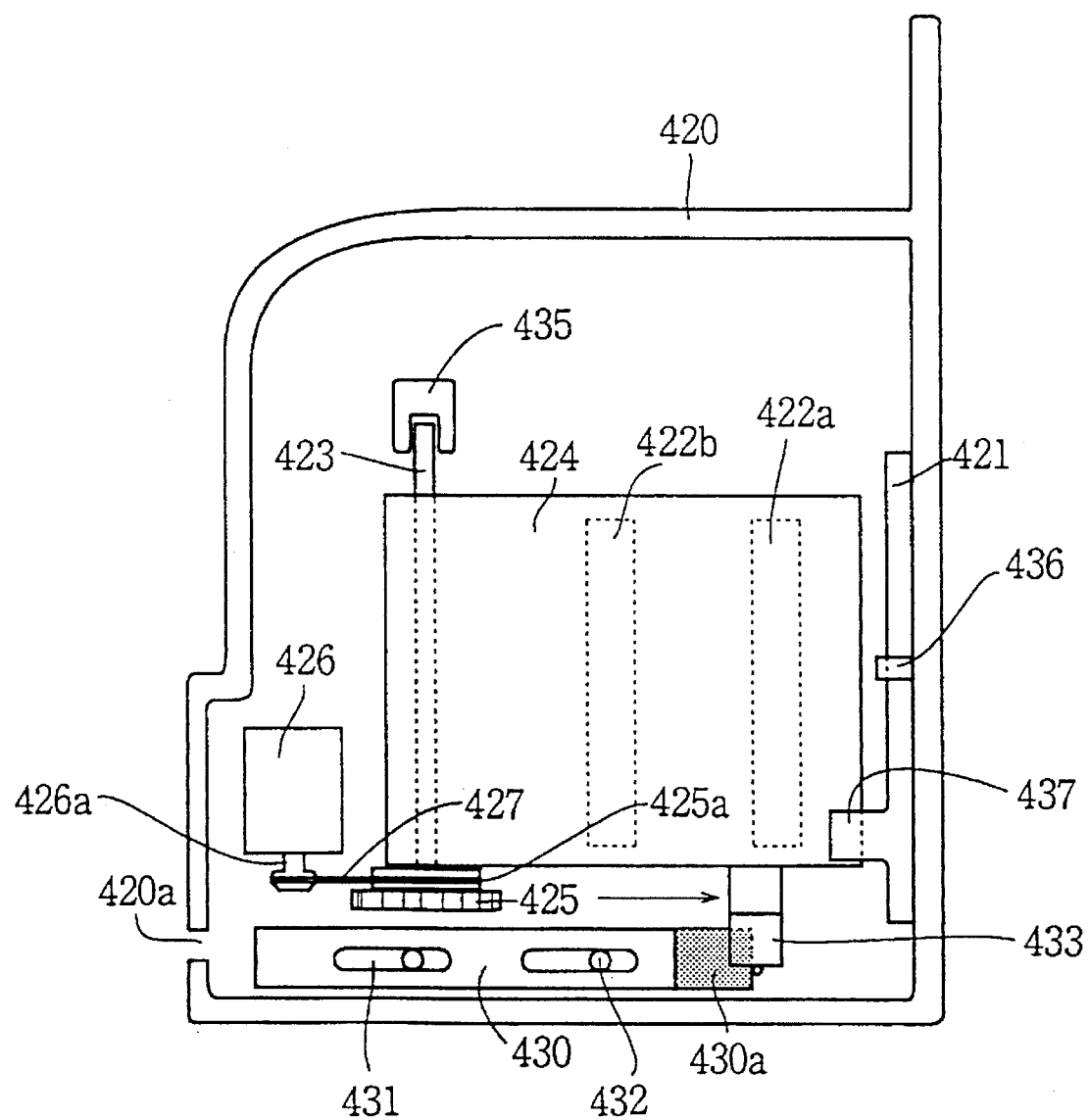
FIG. 19 is a sectional side view of the holder.
Figure 20:
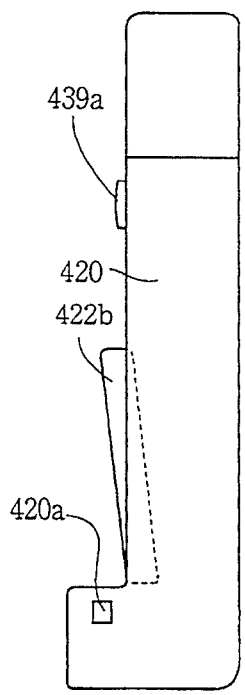
FIG. 20 is a rear view of the holder.

Referring to FIGS. 18 and 19, the left frame member 420 has a supporting member 424 pivotally mounted on a shaft 423. The supporting member 424 is urged to the space 401. The supporting member 424 has a pair of rollers 422a and 422b rotatably mounted thereon. As shown in FIG. 17, the roller 422a (422b) is mounted in the inclined disposition. An upper end of the shaft 423 is rotatably engaged with a support 435. A lower end of the shaft is secured to a gear 425 having a pulley 425a coaxial with the gear 425. A belt 427 is provided between the pulley 425a and a drive shaft 426a of a motor 426. The motor 426 is operated for loading the disc in the holder 400 when the disc is inserted into the inlet 410. The gear 425 engages with a gear 428 which engages with a gear (not shown) for rotating rollers 422a and 422b. The supporting member 242 further has a cam member 433 provided on a lower portion thereof.

The left frame member 420 has a hole 420a corresponding to the reproducing device 200 to be engaged with the push rod 233 of the slider 234. A slider 430 is provide on the lower portion to be slidable in the direction shown by an arrow. The slider 430 has a pair of slits 431 and tapered end 430a engaged with the cam member 433 of the supporting member 424. In the slit 431, a pin 432 secured to the left frame member is engaged.

A lock member 421 is rotatably mounted on a shaft 436 secured to the left member 420 at the inlet 410 for preventing the disc from inserting into the inlet 410. The lock member 421 has a lower engaging portion 437 engaged with a lower end of the supporting member 424 and an upper lock portion 438 (FIG. 17) to be projected on the inlet 410.

Figure 21:
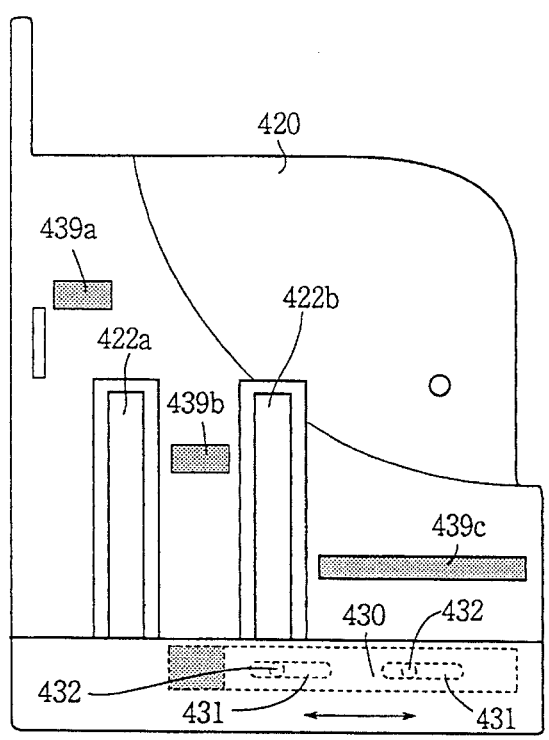
FIG. 21 is a sectional side view of the holder.

As shown in FIG. 21, felts 439a, 439b and 439c are provided on the left frame member 420.

Figure 22:
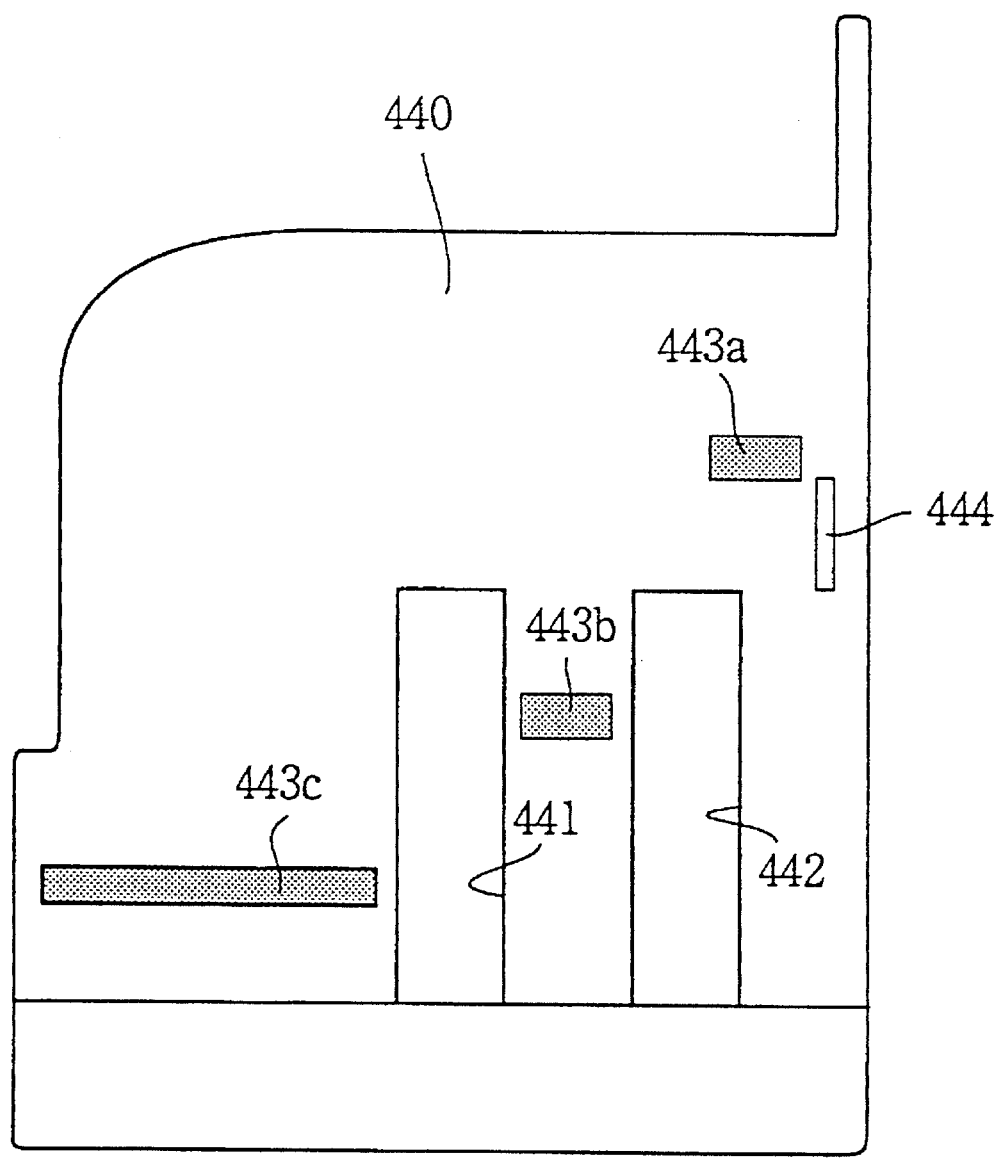
FIG. 22 is a sectional side view of the holder.

FIG. 22 shows the right frame member 440. The right member 440 has a grooves 441 and 442 formed corresponding to the rollers 422a and 422b of the left member 420, and felts 443a, 443b and 443c. An engaging groove 444 is provided to be engaged with the lock portion 438 of the lock member 421.

The operation of the auxiliary disc holder 400 will be described.

When the disc 310 (not shown) is inserted into the inlets 112 and 410, a sensor (not shown) in the holder 400 detects it to drive the motor 426. The motor 426 rotates the drive shaft 426a to rotate the gear 425 through the belt 427 and the pulley 425a. Thus, the gear 428 is rotated to rotate the rollers 422a and 422b. The disc 310 is loaded in the holder 400 and the lower portion of the disc is abutted on the rollers 422a, 422b which are inclined on the supporting member 424. When the disc is loaded on a predetermined position, the motor 426 stops. The disc is engaged with the rollers 422a and 422b and the felts 439a to 439c and 443a to 443c to be stably held in the holder.

It will be seen that length of the roller is determined to a half of the length of the inlet 410.

In this state, if another disc is inserted into the inlet 112, the periphery of that disc is engaged with the disc in the holder, so that the disc can not be inserted into the holder.

In reproducing operation, the reproducing device 200 is moved to the holder 400 and the push rod 233 of the slider 234 is inserted into the hole 420a to push the slider 430 to the right of FIG. 19. Thus, the tapered end 430a is engaged with the cam member 433 of the supporting member 424 to urge the supporting member 424 away from the space 401. Thus, the rollers 422a and 422b are disengaged from the disc. When the supporting member 424 is moved, the lower end thereof is abutted on the engaging portion 437 to rotate the lock member 421 in the clockwise direction of FIG. 17. Thus, the upper lock portion 438 is projected on the inlet 410. The disc is loaded in the reproducing device 200 by the arms 220 and 223 in the same manner as hereinbefore described.

Figure 23:
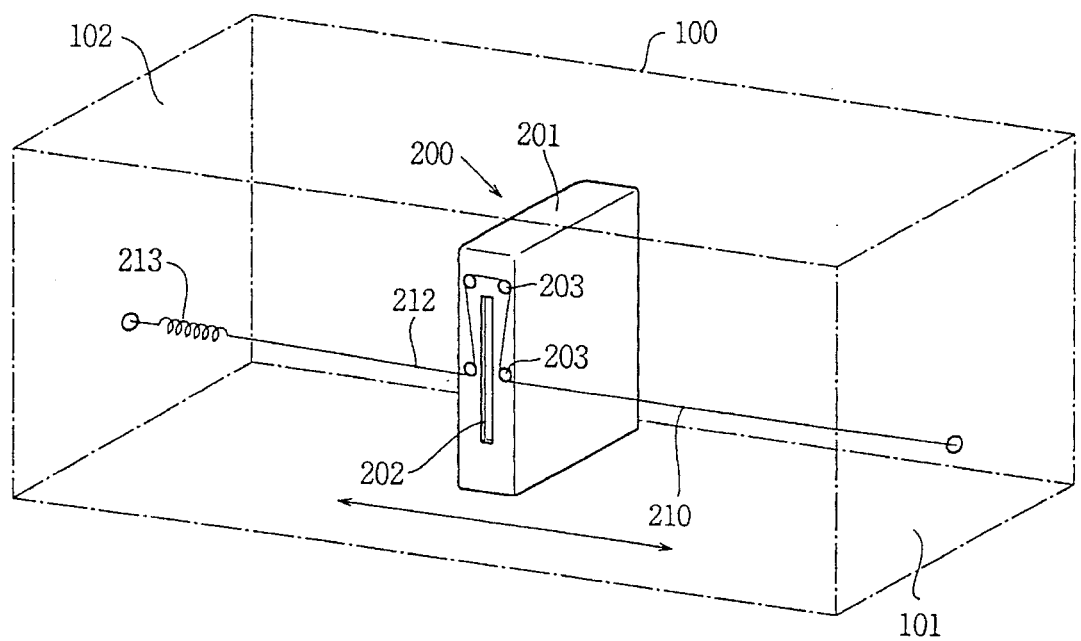
FIG. 23 is a perspective view showing a modification of the system.
Figure 24:
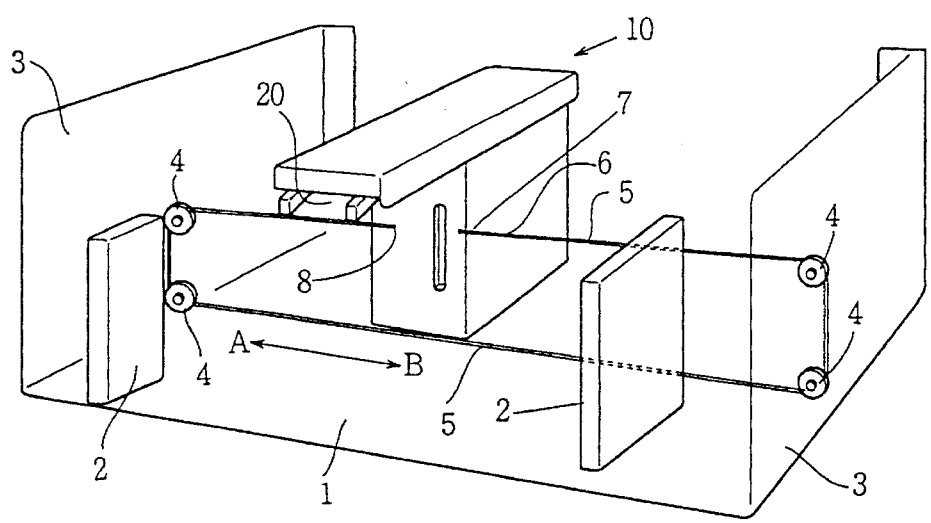
FIG. 24 is a perspective view showing a conventional automatic disc changer system.
Figure 25:
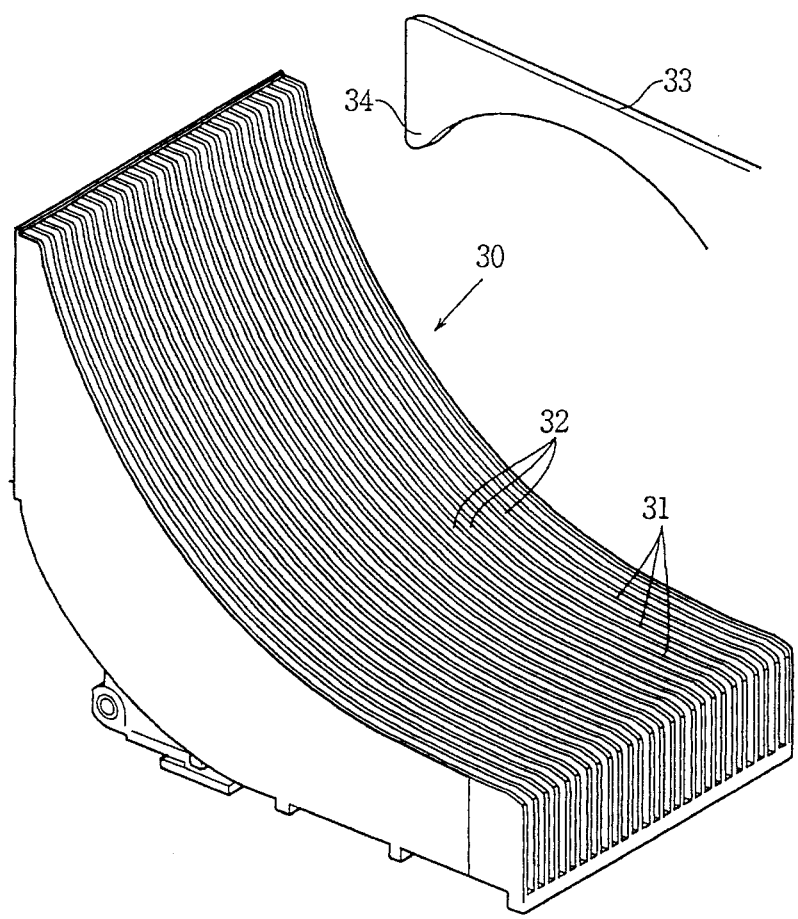
FIG. 25 is a perspective view showing a disc tray of the conventional system.
Figure 26:
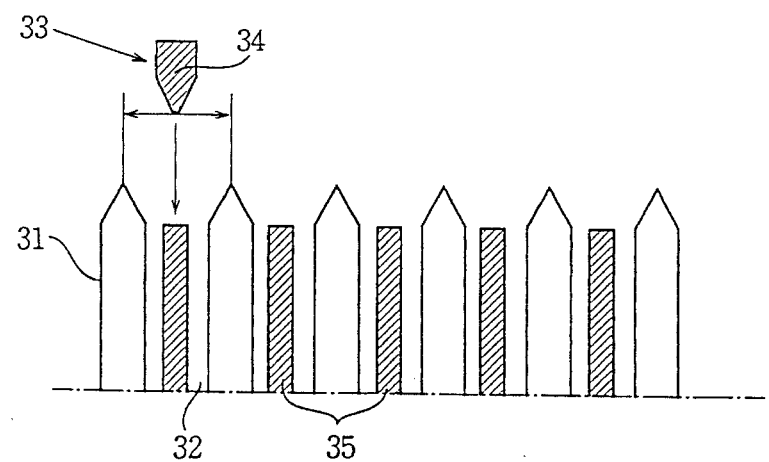
FIG. 26 is a schematic diagram showing a part of the disc tray.

FIG. 23 shows a modification in which a single disc reproducing device 200 is provided. As a further modification, three or more reproducing devices can be provided.

In place of the rollers 203, a pin can be used.

The projections 336 of the triangular prism in the movable frame 330 can be replaced by other shapes, such as a semi-cylindrical shape.

In accordance with the present invention, the width of the entrance gap for the loading arm is twice as much as the pitch of the space for storing the disc, the loading arm is exactly inserted into the space through the gap, guided by the guide projections. Thus, the reproduction of a desired disc is ensured.

Even if the position accuracy of the loading arm and the space is reduced, the loading of the disc is accurately operated.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An automatic disc changer for a disc reproducing system, comprising:

a casing for the automatic disc changer;

a plurality of disc holders arranged in a substantially horizontal direction in the casing, each of said disc holders having a plurality of holding plates forming spaces therebetween for respectively storing a plurality of discs in vertical positions, each space defining a pitch;

a reproducing device provided in the casing to be moved along the disc holders, the reproducing device having a loading arm to be inserted into a corresponding one of the spaces for loading a selected one of the discs on the reproducing device;

a movable frame provided on each of the disc holders to be shifted by the pitch of a corresponding one of the spaces in the substantially horizontal direction of arrangement of the disc holders, the movable frame including a plurality of guide projections disposed adjacent to ends of the holding plates, the guide projections being spaced apart by a pitch which is twice as much as the pitch of each of the spaces, each of the guide projections having a triangular section defining a bottom portion which is approximately equal to the pitch of each of the spaces so as to close a corresponding one of the spaces when positioned thereover, and shifting means for shifting the movable frame and in turn the guide projections by a distance corresponding to the pitch of each of the spaces.

2. The automatic disc changer according to claim 1, wherein the end of each of the holding plates has a triangular tip end.

3. The automatic disc changer according to claim 2, wherein both edges of the bottom portion of each guide projection are disposed adjacent to tip ends of said triangular tip ends of a pair of adjacent holding plates.

4. The automatic disc changer according to claim 1, wherein said shifting means comprises a cam mechanism provided between the movable frame and the reproducing device.

* * * * *